(12) United States Patent
Walmsley et al.

(10) Patent No.: US 6,633,386 B2
(45) Date of Patent: Oct. 14, 2003

(54) OPTICAL PULSE MEASUREMENT USING SHEARING INTERFEROMETRY, ESPECIALLY SUITABLE FOR CHARACTERIZING ULTRASHORT PULSES

(75) Inventors: Ian A. Walmsley, Oxford (GB); Christophe Dorrer, Matawan, NJ (US)

(73) Assignee: The University of Rochester, Rochester, NY (US)

( * ) Notice: Subject to any disclaimer, the term of this patent is extended or adjusted under 35 U.S.C. 154(b) by 0 days.

(21) Appl. No.: 10/200,982

(22) Filed: Jul. 22, 2002

(65) Prior Publication Data

US 2003/0025911 A1 Feb. 6, 2003

Related U.S. Application Data

(60) Provisional application No. 60/307,195, filed on Jul. 23, 2001.

(51) Int. Cl.[7] .................................................. G01B 9/02
(52) U.S. Cl. ...................................................... 356/450
(58) Field of Search ................................ 356/450, 520

(56) References Cited

U.S. PATENT DOCUMENTS

| | | | |
|---|---|---|---|
| 3,549,239 A | 12/1970 | Brienza et al. | |
| 3,551,034 A | 12/1970 | Tournois et al. | |
| 3,679,313 A | 7/1972 | Rosenberg | |
| 3,720,884 A | 3/1973 | Kelley et al. | |
| 3,943,457 A | 3/1976 | Lehmberg | |
| 4,612,641 A | 9/1986 | Corkum | |
| 4,750,809 A | 6/1988 | Kafka et al. | |
| 5,101,456 A | 3/1992 | Islam | |
| 5,212,698 A | 5/1993 | Kafka et al. | |
| 5,359,410 A * | 10/1994 | Diels et al. | ................... 356/450 |
| 5,453,871 A | 9/1995 | Kolner et al. | |
| 5,530,544 A * | 6/1996 | Trebino et al. | .............. 356/450 |
| 5,535,000 A | 7/1996 | Shirasaki | |
| 5,642,194 A | 6/1997 | Erskine | |
| 5,684,586 A | 11/1997 | Fortenberry et al. | |
| 6,456,380 B1 * | 9/2002 | Naganuma | ................... 356/450 |

FOREIGN PATENT DOCUMENTS

EP     WO 99/06794     * 2/1999

OTHER PUBLICATIONS

Wong, V. et al., *Analysis of ultrashort pulse–shape measurement using linear interferometers*, Optics Letters, vol. 19, No. 4, pp. 287–289, (1994).

Takeda, M. et al., *Fourier–transform method of fringe–pattern analysis for computer–based topography and interferometry*, J. Opt. Soc. Am., vol. 72, No. 1, pp. 156–160, (1982).

Reynaud, F. et al., *Measurement of phase shifts introduced by nonlinear optical phenomena on subpicosecond pulses*, Optics Letters, vol. 14, No. 5, pp. 275–277, (1989).

Treacy, E., *Optical Pulse Compression With Diffraction Gratings*, IEEE Journal of Quantam Electronics, vol. QE–5, No. 9, pp. 454–458, (1969).

(List continued on next page.)

*Primary Examiner*—Samuel A. Turner
(74) *Attorney, Agent, or Firm*—Kenneth J. Lukacher; Martin Lukacher

(57) ABSTRACT

Pulse measurement for characterization of ultra-short optical pulses using spectral phase interferometry for direct electric field reconstruction (SPIDER) is enhanced by utilizing a plurality of spectral phase differences derived from the pulse and measured and frequency sheared replicas, which are temporally and/or spatially displaced, thereby providing spatial or temporal characterization or enhancing the temporal characterization of the input pulse in amplitude and phase. Improved interferometry which is not reliant on non-linear elements can be used.

16 Claims, 14 Drawing Sheets

OTHER PUBLICATIONS

Chu, K. C. et al., *Direct measurement of the spectral phase of femtosecond pulses*, Optics Letter, vol. 20, No. 8, pp. 904–906, (1995.

Zubov, V.A. et al., *Solution of the phase problem for time–dependent optical signals by an interference system*, Sov. J. Quantum Electron, vol. 21, No. 11, pp. 1285–1286, (1991).

Chilla, J. et al., *Direct determination of the amplitude and the phase of femtosecond light pulses*, Optics Letters, vol. 16, No. 1, pp. 39–41, (1991).

Rhee, J. et al., *Real–time dispersion analyzer of femtosecond laser pulses with use of a spectrally and temporally resolved upconversion technique*, J. Opt. Soc. Am. B, vol. 13, No. 8, pp. 1780–1785, (1996).

Prein, S. et al., *Complete characterization of femtosecond pulses using an all–electronic detector*, Optics Communications, 123, pp. 567–573, (1996).

Kane, D. et al., *Characterization of Arbitrary Femtosecond Pulses Using Frequency–Resolved Optical Gating*, IEEE Journal of Quantum Electronics, vol. 29, No. 2, pp. 571–579, (1993).

Wong, V. et al., *Ultrashort–pulse characterization from dynamic spectograms by iterative phase retrieval*, J. Opt. Soc. Am. B, vol. 14, No. 4, pp. 944–949, (1997).

Walmsley, I. et al., *Characterization of the electric field of ultrashort optical pulses*, J. Opt. Soc. Am. B, vol. 13, No. 11, pp. 2453–2463, (1996).

Walmsley, I. et al., *Measuring Fast Pulses*, Optics & Photonics News, vol. 7, No. 23, pp. 24–29, (1996).

Lepetit, L. et al., *Linear techniques of phase measurement by femtosecond spectral interferometry for applications in spectroscopy*, J. Opt. Soc. Am. B, vol. 12, No. 12, pp. 2467–2474, (1995).

Rothenberg, J. et al., *Measurement of optical phase with subpicosecond resolution by time–domain interferometry*, Optics Letters, vol. 12, No. 2, pp. 99–101, (1987).

Zubov, V. et al., *Analysis of Temporal Characteristics of Optical Pulses by Means of an Acousto–Optical Cell*, Laser Physics. vol. 2, No. 1, pp. 73–76, (1992).

Diels, J. et al., *Investigation of the Parameters Affecting Subpicosecond Pulse Durations in Passively Mode Locked Dye Lasers*, Proceedings of the First International Conference on Picosecond Phenomena, Springer, New York, pp. 117–120, (1978).

Fittinghoff, D. et al., *Measurement of the intensity and phase of ultraweak, ultrashort laser pulses*, Optics Letters, vol. 21, No. 12, pp. 884–886, (1996).

Azzam, R.M.A., *Polarization Michelson Interferometer (POLMINT): its use for polarization modulation and temporal pulse shearing*, Optics Communications, vol. 98, No. 1, 2, 3, pp. 19–23 (1993).

Iaconics, C. et al., *Spectral phase interferometry for direct electric field reconstruction of ultrashort optical pulses*, Opt. Lett., vol. 23, No. 10, pp. 792–794 (1998).

Dorrer, C., *Influence of the calibration of the detector on spectral interferometry*, J. Opt. Soc. Am. B, vol. 16, No. 7, pp. 1160–1168 (1999).

Naganuma, K. et al., *Direct Measurement of Spectral Phase of Femtosecond Pulses using Optical Parametric Effect*, Ultrafast Phenomena XII, pp. 144–146, T. Elasser, S. Mukamel, M. Murnane and N. Scherer eds. (Springer, Berlin, 2001).

Bor, Z., *Distortion of femtosecond laser pulses in lenses*, Optics Letters, vol. 14, No. 2, pp. 119–121 (1989).

Kovacs, A. et al., *Group delay measurement on laser mirrors by spectrally–resolved white–light interferometry*, Opt. Lett., vol. 20, No. 7, pp. 788–790 (1995).

Diddams, S. et al., *Full–field characterization of femtosecond pulses after nonlinear propagation*, C.L.E.O., CFF3, p. 519, (1998).

Gallmann, L. et al., *Spatially resolved amplitude and phase characterization of femtosecond optical pulses*, Opt. Lett., vol. 26, No. 2, pp. 96–98, (2001).

Sacks, Z. et al., *Adjusting pulse–front tilt and pulse duration by use of a single–shot autocorrelator*, Opt. Lett., vol. 26, No. 7, pp. 462–464, (2001).

Bor, Z. et al., *Femtosecond–resolution pulse–front distortion measurement by time–of–flight interferometry*, Opt. Lett., vol. 14, No. 16, pp. 862–864, (1989).

Benko, Z. et al., *Pulse Front Distortion Measurements in Prisms Measured by Time–of–Flight Interferometry*, Experimentelle Technik der Physik, vol. 39, 4/5, pp. 447–449, (1991).

Radzewicz, C. et al., *Interferometric measurement of femtosecond pulse distortion by lenses*, Opt. Comm., vol. 126, pp. 185–190 (1996).

Iaconics, C. et al., *Self–Referencing SPectral Interferometry for Measuring Ultrashort Optical Pulses*, IEEE Journal of Quantum Electronics, vol. 35, No 4, pp. 501–509, (1999).

Dorrer, C., *Single–shot real–time characterization of chirped–pulse amplification systems by spectral phase interferometry for direct electric–field reconstruction*, Opt. Lett., vol. 24, No. 22, pp. 1644–1646, (1999).

Anderson, M. et al., *Ultrafast Balanced–Homodyne Chronocyclic Spectrometer*, SPIE, vol. 2701, pp. 142–151, (1996).

Gallman, L. et al., *Characterization of sub–6fs optical pulses with spectral phase interferometry for direct electric–field reconstruction*, Opt. Lett., vol. 24, No. 18, pp. 1314–1316, (1999).

\* cited by examiner

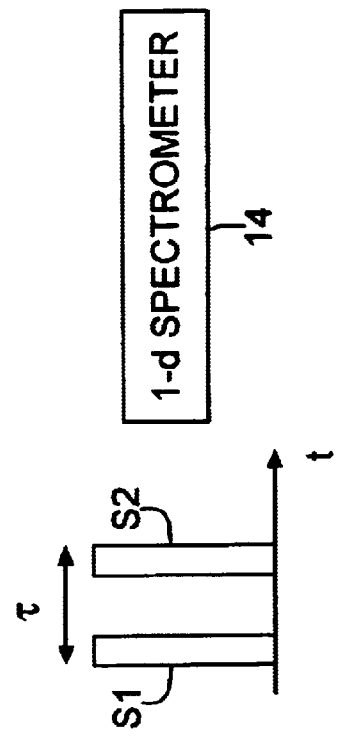
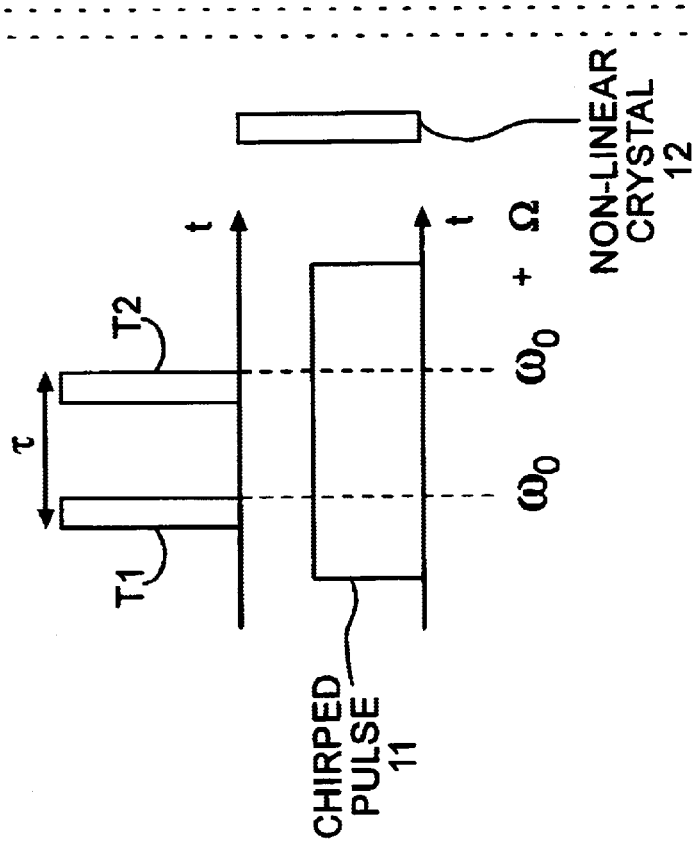
FIG. 1b
(PRIOR ART)

US 6,633,386 B2

OPTICAL PULSE MEASUREMENT USING SHEARING INTERFEROMETRY, ESPECIALLY SUITABLE FOR CHARACTERIZING ULTRASHORT PULSES

This application claims the benefit of priority to U.S. Provisional Patent Application No. 60/307,195, filed Jul. 23, 2001, which is herein incorporated by reference.

FIELD OF THE INVENTION

The present invention relates to enhanced systems (methods and apparatus) for measurement or characterization in amplitude and phase of optical pulses using spectral phase interferometry for direct electric field reconstruction (SPIDER). More specifically, the invention uses temporally and/or temporally and spatially displaced phase differences which can be derived from a plurality of reference (homodyne) pulses and delayed replicas of the pulse to be measured, or from a plurality of spatially encoded, spectrally sheared replicas (SEA-SPIDER), or from time sheared and laterally separated replicas (space time or ST-SPIDER).

BACKGROUND OF THE INVENTION

Ultrashort optical pulses now find wide application in many different fields including physics, chemistry, biology, materials processing and telecommunications, to name a few. Methods for characterization of the electric field of these pulses, i.e. the pulse shape in the time domain, have played a prominent role in advancing ultrafast technology. In many applications it is important both to optimize the pulse shape and to know the shape with reasonable accuracy, in order to interpret the results of an experiment. Such information is becoming increasingly important as the notion of control of nonlinear optical systems and processes (such as femtosecond laser machining and femtosecond laser tissue ablation) becomes more feasible.

It has been proposed to characterize the field of ultrashort optical pulses, but few of them have turned out to be useful practical solutions. Currently commercially available techniques include intensity autocorrelators, Frequency Resolved Optical Gating (FROG) and Spectral Phase Interferometry for Direct Electric-field Reconstruction (SPIDER). One of the inventors hereof is one of the inventors of SPIDER which is described in International Application No. PCT/US98/15355, published on Feb. 11, 1999 under International Publication No. WO99/06794, and U.S. patent application Ser. No. 09/463,918, filed Apr. 12, 2000 having priority to International Application No. PCT/US98/15355. Intensity autocorrelators were among the earliest tools used to measure the time evolution of short optical pulses. However, they only measure the temporal concentration of the energy, and not the shape of the electric field pulse itself, and do not therefore provide complete information about the pulse. FROG provides the pulse shape, but needs a lot of data and a sophisticated and intense numerical processing of these data to retrieve the pulse shape. SPIDER, because of its simple operating principles, needs far less data to retrieve the same information. Also, the processing is direct, which makes it very quick and error-free. The present invention uses and enhances SPIDER.

SPIDER as described in the above-referenced application provides a method and apparatus for measuring the electric field of ultrashort optical pulses using spectral shearing interferometer 13 (FIG. 1a). Its basic operating principle is as follows: two replicas T1 and T2 of the input test pulse 10 (i.e., the pulse one wishes to characterize) are delayed from each other by time τ, and interact with a long chirped pulse 11 in a nonlinear crystal 12 (FIG. 1b). In a chirped pulse, the instantaneous frequency (i.e., the color) varies with time, so that each of the replicas T1 and T2 interacts with a different frequency in the chirped pulse (respectively $\omega_0$ and $\omega_0+\Omega$). The nonlinear interaction shifts the mean frequency of each replica T1 and T2 by a different amount to provide the frequency-shifted replicas S1 and S2 which are then incident on a spectrometer 14, e.g., a one-dimensional (1-d) spectrometer. In the spectrometer, an array detector records the resulting spectral interferogram. The spectral phase of the input pulse 10 can be extracted from this interferogram using standard Fourier processing techniques. This quantity, when combined with the spectrum of the input pulse, completely characterizes the pulse. In this implementation, it is very important to calibrate properly the delay τ between the two initial pulses. Also, this delay sets a higher limit on the resolution of the spectrometer.

SUMMARY OF THE INVENTION

Briefly described, the present invention obtains and utilizes a plurality of spectral phase differences. A first embodiment applies the principle of homodyne detection to SPIDER. This dramatically improves the signal-to-noise ratio, thus enhancing the sensitivity of SPIDER. It also relaxes the constraints on the parameters used for the measurement. A second embodiment also allows one to relax the constraints on experimental parameters, and allows an easier implementation in some specific cases. It makes use of a different way of encoding and extracting the SPIDER signal. A third embodiment characterizes the pulse field at arbitrary transverse locations in the beam. While the electric field is a function of time only for the purpose of pulse measurement, actually, it is also a function of space. Differences in the field at different locations, which are very common in experiments using ultrashort optical pulses, can be very detrimental in applications. The present invention therefore provides for enhanced optical pulse measurement and thus may be used to achieve optimal output from ultrafast (e.g., subpicosecond) laser systems. Therefore, the invention has applications for the characterization of ultrabroadband pulses. The invention is useful for the study of the interaction of ultrashort optical pulses with matter.

BRIEF DESCRIPTION OF THE DRAWINGS

The foregoing objects, features and advantages of the invention will become more apparent from a reading of the following description in connection with the accompanying drawings, in which:

FIGS. 1a and 1b are a schematic of a conventional SPIDER system and a diagram illustrating the operation thereof, respectively.

DETAILED DESCRIPTION OF THE INVENTION

Figure 2A:
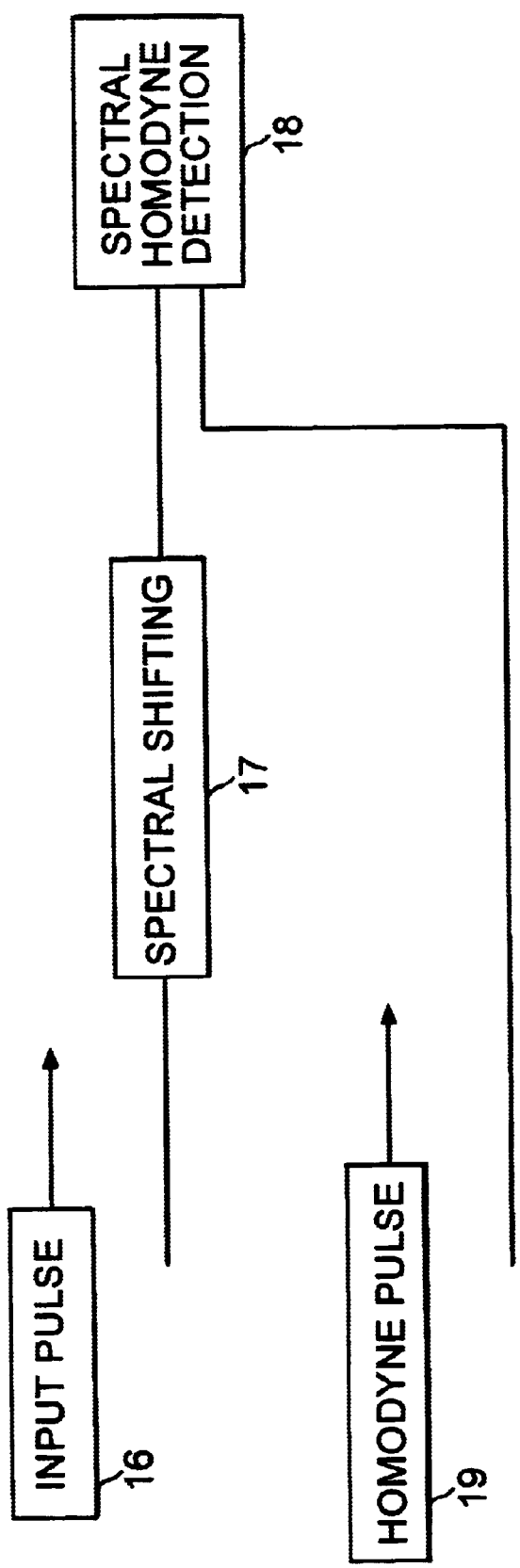
FIGS. 2a and 2b are respectively, a schematic and a diagram illustrating, the operation of a first embodiment of the invention called a Homodyne SPIDER (HOT-SPIDER).
Figure 2B:
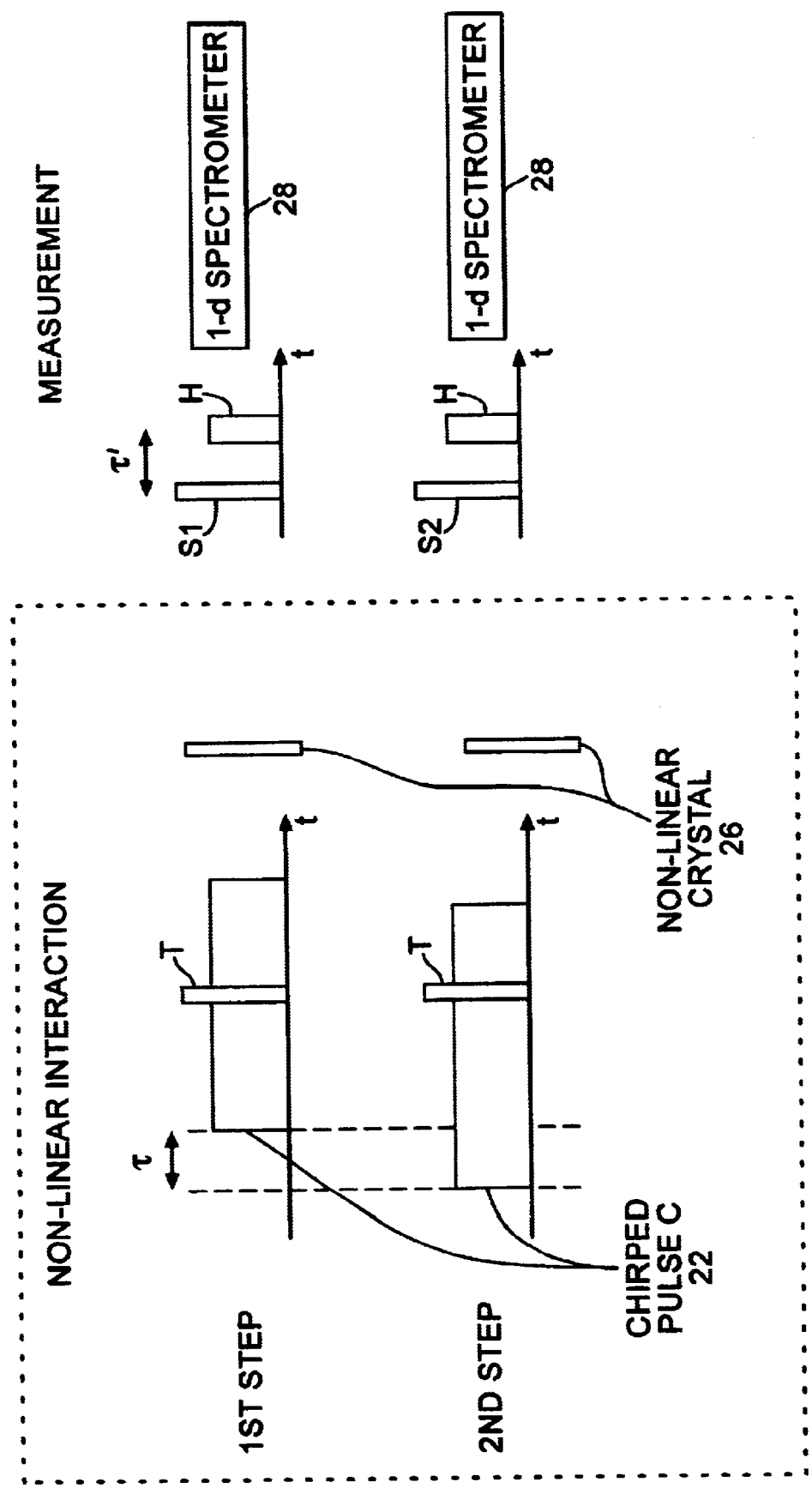
Figure 3:
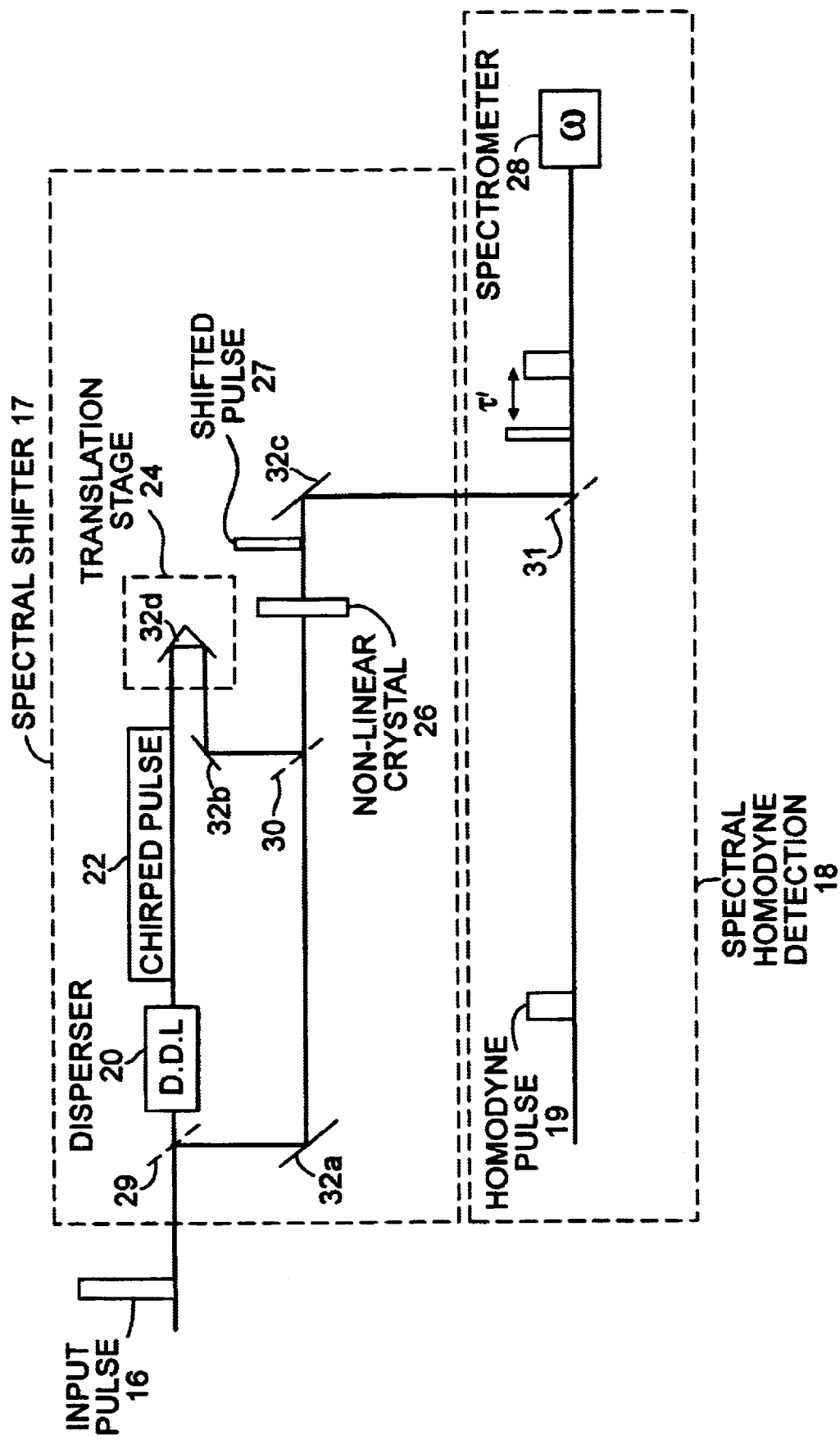
FIG. 3 is a schematic diagram of an exemplary Homodyne SPIDER.

Referring to FIGS. 2a, 2b and 3, there is shown an embodiment of the invention Homodyne (HOT) SPIDER which allows to retrieve the same information as conventional SPIDER in two measurements (instead of one) but with some technical advantages. Consider that one has an ancillary homodyne pulse H at the same frequency as the frequency-shifted replicas (S1 and S2) of the input test pulse (FIG. 2a). One can retrieve the phase difference between S1 and S2 by first measuring the phase difference between S1 and H, then measuring the phase difference between S2 and H, and finally subtracting the first phase from the second (FIG. 2b). The first advantage of this approach is that the energy of the ancillary pulse can be much larger than the energy of each of the SPIDER replicas. In these conditions, the signal to noise ratio is much higher for each of the measurements in homodyne SPIDER than in the conventional SPIDER. This leads to a more accurate retrieval of the pulse shape. A second advantage is that the delay between the interfering pulses in the first and second measurement is identical, so that the dominant spectral phase terms in the two measured interferograms naturally cancel by subtraction. This means that the experimenter need not calibrate this delay at all, thus freeing him or her from performing a procedure that must done with high accuracy. The third advantage is that one uses one exact replica of the input pulse to generate S1 for the first measurement, and then S2 for the second measurement. This makes the implementation easier in cases when the generation of two identical replicas would be technically difficult, such as for pulses in the X-ray region of the spectrum. The fourth advantage is that the delay between the interfering pulses in homodyne SPIDER is not related to the desired shear. Because it is possible to achieve significant shear even with a small homodyne delay, the resolution constraint on the spectrometer is relaxed compared to conventional SPIDER.

The nonlinear interaction of a single replica (T) of the input test pulse 16 to be characterized with the chirped pulse 22 (C) in a nonlinear crystal shifts the complex amplitude of the replica by a frequency $\omega_0$. This shift can be modified by changing the delay between T and C by translation stage 24, since an additional delay $\tau$ leads to a shift $\omega_0+\Omega$. The shifted pulse is combined with the homodyne pulse 19 and the resulting field is directed to a monodimensional spectrometer 28. As shown in FIG. 3, in spectral shifter 17 a portion of the input test pulse 16 is transmitted by a beam splitter 29 to a disperser 20 to provide a chirped pulse 22 which then passes via mirrors 32d of a translation stage 24 and a mirror 32b to a beam splitter 29, where the chirped pulse combined with the portion of the input test pulse 16 deflected by beam splitter 29 via mirror 32a, interacts in a non-linear crystal 26 to provide a shifted pulse 27. In spectral homodyne detection 18, the shifted pulse 27 is combined with the homodyne pulse 19 by beam splitter 31, and the resulting field directed to spectrometer 28. The disperser 20, chirped pulse 22, and non-linear crystal 26, are described in International Application No. PCT/US98/15355, filed Jul. 24, 1998, and U.S. patent application Ser. No. 09/463,918, filed Apr. 12, 2000 having priority to International Application No. PCT/US98/15355, which are herein incorporated by reference.

The homodyne pulse H should have a spectrum which spans that of the frequency-shifted replica S1. For example, it may be obtained from the input pulse by self-frequency shifting (e.g., by second harmonic generation, which is suitable for the case of an upconversion interaction between T and C).

The spectral phase difference between H and the frequency-shifted replica S1 can be measured with Fourier Transform Spectral interferometry (FTSI), yielding the spectral phase difference $\Phi_H(\omega)-\Phi(\omega-\omega_0)+\omega\tau'$, where $\tau'$ is the delay between H and S1 and $\Phi_H(\omega)$ is the spectral phase of H itself.

Now one performs a second measurement, using a different delay between the chirped pulse C and the replica T of the input pulse to generate a second frequency-shifted replica S2. Keeping the same delay between the homodyne pulse H and the replica S2 as between H and S1, one may extract the spectral phase difference $\Phi_H(\omega)-\Phi(\omega-\omega_0-\Omega)+\omega\tau'$ from the measured interferogram.

Subtracting the first recovered phase from the second, one obtains $\Phi(\omega-\omega_0)-\Phi(\omega-\omega_0-\Omega)$, that is, the same information as in the conventional SPIDER after removal of the linear term. It suffices to shift the phase difference by $\omega_0$ and concatenate the phase to get the spectral phase of the input pulse.

The signal for the measurement of the phase difference between the homodyne pulse and the replica is proportional to $|\tilde{E}_H(\omega)||\tilde{E}_S(\omega)|$, and can be made larger than the apposite signal $|\tilde{E}_{S1}(\omega)||\tilde{E}_{S2}(\omega)|$ measured in a conventional SPIDER interferogram. For example, in this embodiment, the homodyne pulse is generated by upconversion of the test pulse with itself, while a SPIDER replica is generated by upconversion of the test pulse with a highly chirped pulse. The homodyne pulse has thus a higher energy, i.e., $|\tilde{E}_H(\omega)|>|\tilde{E}_S(\omega)|$, giving more overall signal and hence a more accurate measurement. The bandwidth of H can be larger than the bandwidth of S, i.e., $|\tilde{E}_H(\omega)|$ has significant amplitude over a larger range of frequencies $\omega$ than $|\tilde{E}_S(\omega)|$. The signal in the spectral wings of the pulse is therefore increased compared to conventional SPIDER and the reconstruction of the pulse shape has enhanced local precision. H may be generated using a highly efficient, large-bandwidth non-linear element, for example, a quasi-phase-matched structure, which could not be used directly for the conventional SPIDER.

Apart from the increase in sensitivity, there are at least three technical advantages of HOT SPIDER. As a single replica is needed, this can be useful when generating two identical replicas would be difficult. Secondly, the large linear term on the phase $\omega\tau$ makes Fourier Transform Spectral Interferometry sensitive to the calibration of the spectrometer. In SPIDER, this is usually not detrimental since a reference phase can be measured to exactly remove the linear term. In the homodyne implementation, $\omega\tau'$ is automatically removed by subtraction, and there is no need for a reference phase, which might simplify some SPIDER schemes. The third advantage relies on the fact that the delay $\tau'$ between S1 and H in the first measurement, and S2 and H in the second measurement, is a free parameter and can be set to a small value (as long as the principle of FTSI can be applied). As the response of a spectrometer is a decreasing function of the spatial frequency on the detector, i.e., a decreasing function of the delay between the two interfering pulses in Spectral Interferometry, smaller delays give a higher interferometric signal and relax constraints on the resolution of the spectrometer (for example, a broader slit can be used to increase the signal). In a conventional SPIDER setup, the instantaneous frequency in the chirped pulse must remain constant during the interaction with each of the replicas, but must be significantly different for each replica. For example, delays of the order of 2 ps must be used for the characterization of 50 fs pulses. In the homodyne setup, the shear is set by delaying the chirped pulse between the two measurements by $\tau$ and $\tau'$ is arbitrary.

Figure 4A:
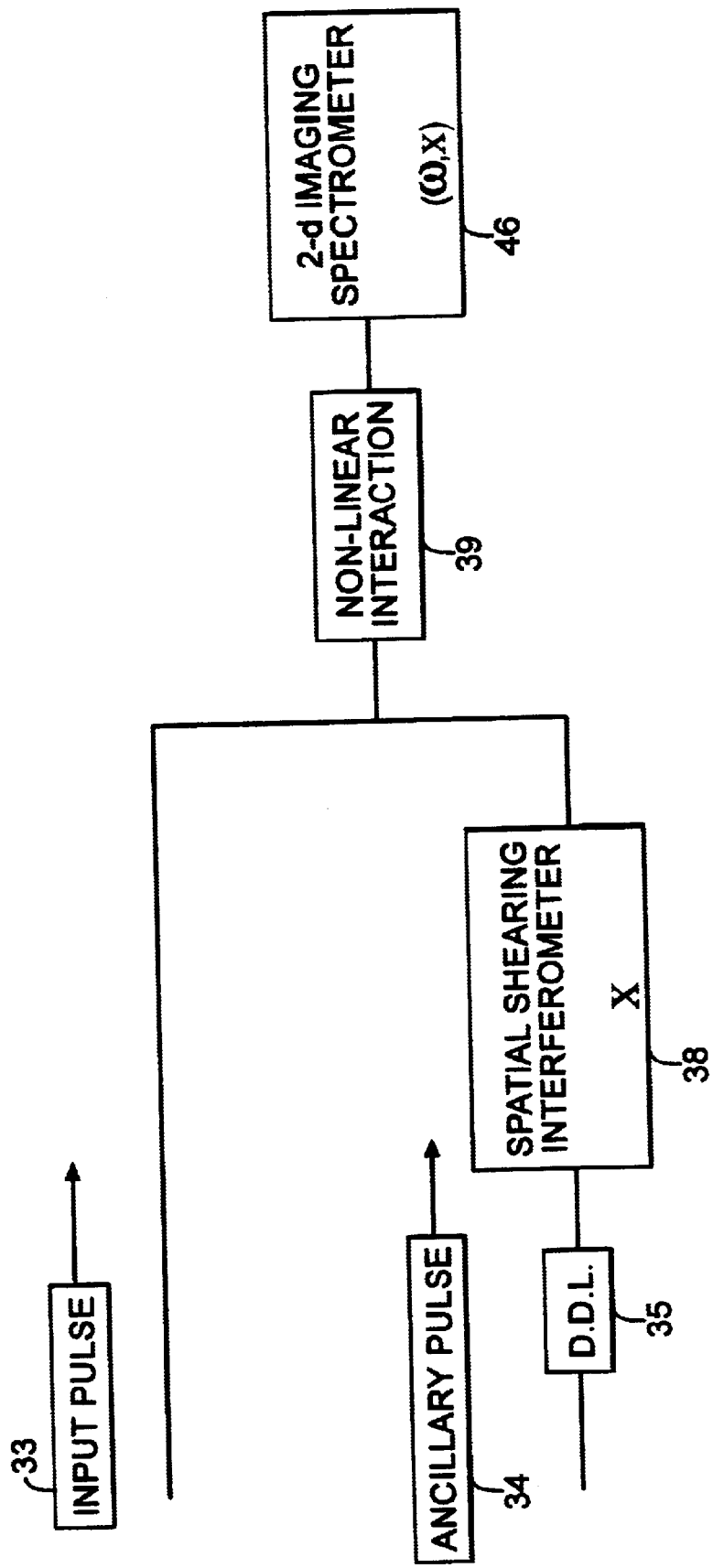
FIGS. 4a and 4b are respectively, a schematic and a diagram illustrating the operation of a Spatially Encoded SPIDER.
Figure 4B:
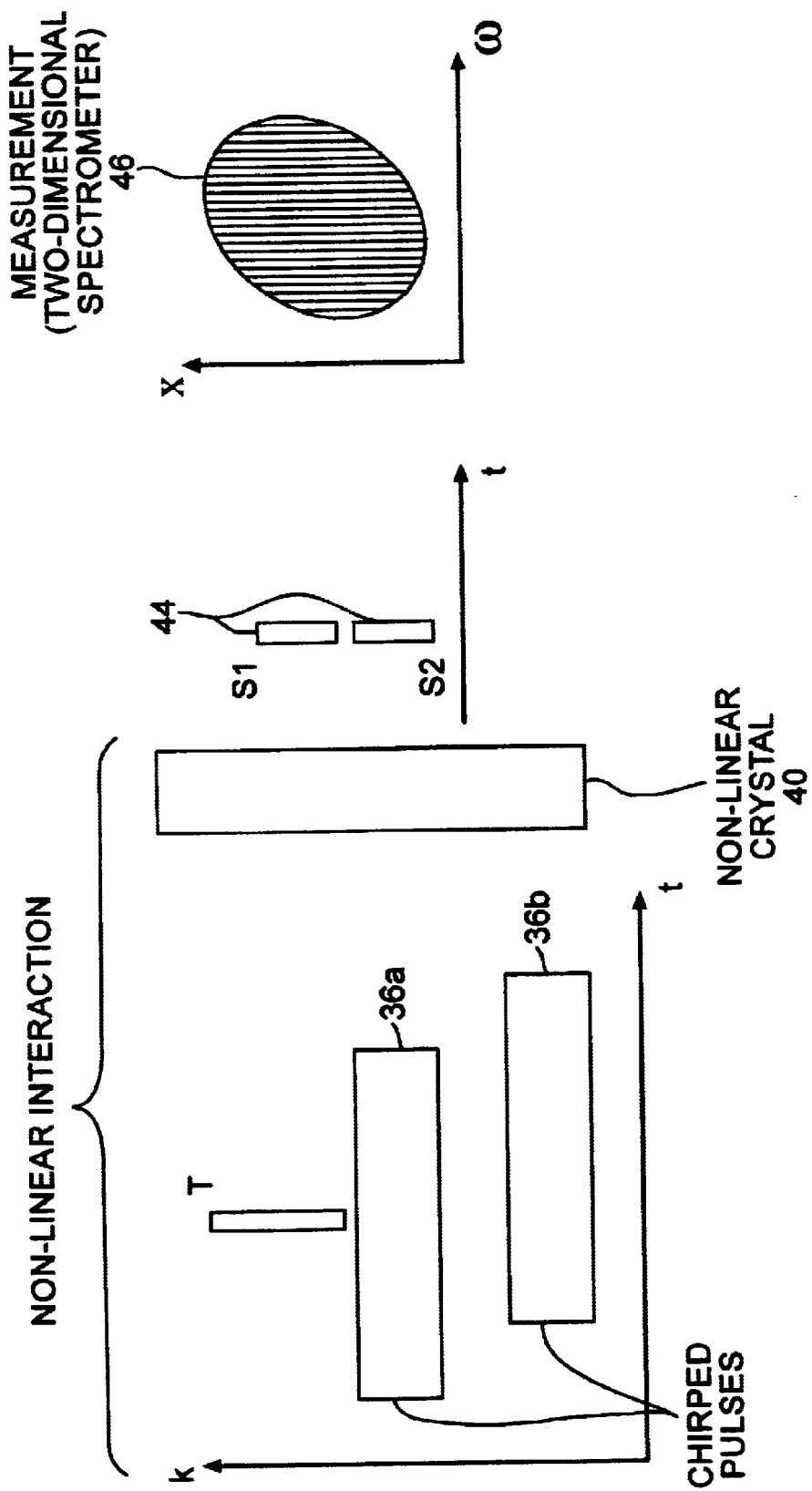

Referring to FIGS. 4a, 4b, 5 and 6, there is shown a spatially encoded or SEA-SPIDER system. In conventional SPIDER, the delay between the two interfering pulses has two purposes. It first ensures that the two replicas are interacting in the nonlinear crystal with different frequencies from the chirped pulse, which is the real basis of spectral shearing interferometry. The second purpose is that the phase difference between the two replicas can only be extracted directly using Fourier processing if such a delay is present, since it allows one to separate the useful interferometric component in the SPIDER signal from the non-interferometric spectra of the upconverted pulses. In conventional SPIDER, it is important to generate two exact replicas of the input pulse. It is also important to accurately calibrate the delay between the interfering pulses. These constraints make the characterization of ultrabroadband pulses difficult. The second embodiment avoids these constraints by using a different geometry for the nonlinear interaction, and a different encoding of the interferometric component (FIGS. 4a and 4b). It is based on a single replica of the input pulse and two replicas of the same chirped pulse one uses in conventional SPIDER, delayed by the same delay one would use in SPIDER. The input pulse again interacts with two different instantaneous frequencies from the two chirped pulses, which creates the spectral shear. The encoding of the phase information in this geometry is achieved by separating the frequency-shifted beams in the spatial domain. This is done by propagating the two chirped pulse beams in two different directions when interacting with the test pulse T in the non-linear crystal (i.e., with different transverse directions k). This ensures that the two frequency-shifted replicas of the input pulse will generate spatial fringes when they are focused on the slit of the spectrometer (instead of the spectral fringes of conventional SPIDER). The signal has to be acquired using a two-dimensional spectrometer (i.e., a device that can measure the spectrum as a function of the spatial position in a beam). The spatial fringes allow one to separate the useful interferometric component using the same kind of Fourier processing techniques as conventional SPIDER. The advantage is that one does not need to resolve any spectral fringes, which relaxes the constraint on the resolution of the spectrometer. Also, there is no delay between the interfering pulses, and thus no calibration of this quantity is needed. Finally, in some cases, generating two replicas of the test pulse (which is needed for conventional SPIDER) can be more difficult to achieve properly than generating two replicas of the chirped pulse (which is done in SEA-SPIDER). This is, for example, the case when characterizing an ultrabroadband pulse.

Figure 5:
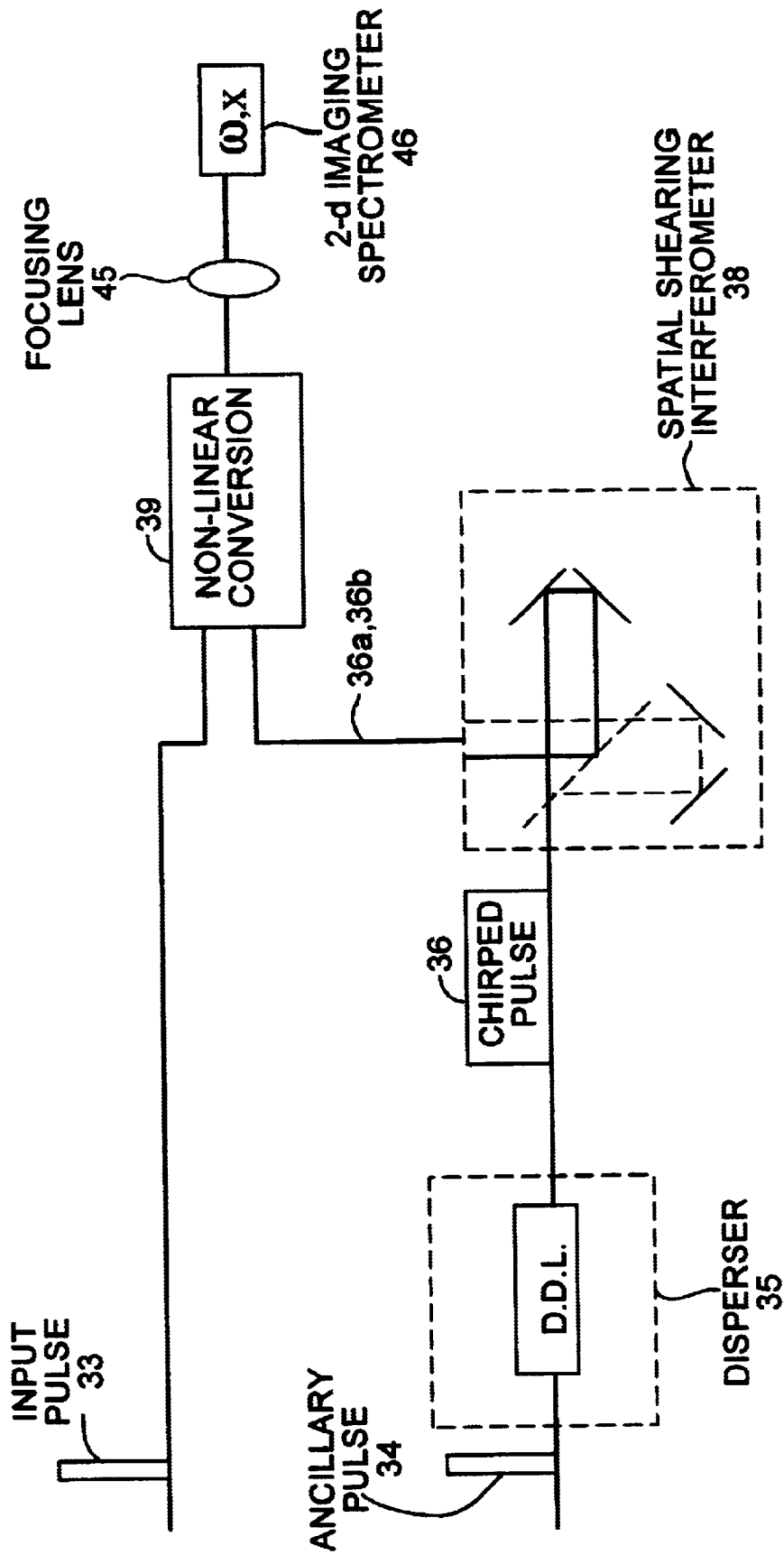
FIG. 5 is a diagram schematically showing an embodiment of a Spatially Encoded Arrangement for SPIDER (SEA-SPIDER).
Figure 6:
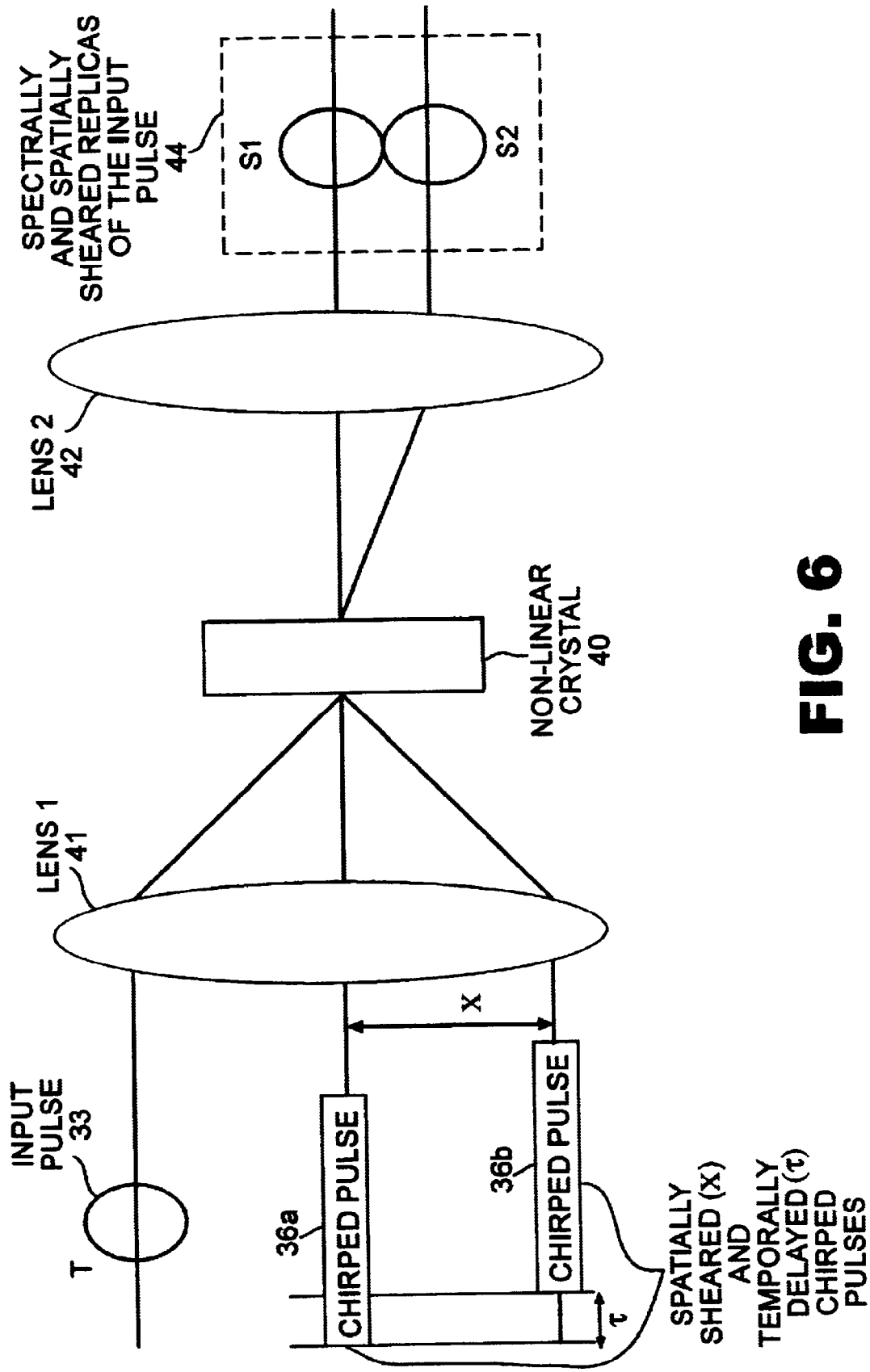
FIG. 6 is a diagram showing an embodiment of the non-linear conversion subcomponent of SEA-SPIDER of FIG. 5.

The measured interferogram in this Spatially-Encoded Arrangement for SPIDER (SEA-SPIDER) is that of two pulses overlapping in space but traveling in different directions (i.e., whose wavefronts are tilted with respect to one another). As in conventional SPIDER the two pulses are replicas but have different center frequencies. This configuration can be implemented in the following way (FIG. 5). A chirped pulse 36 is generated by a disperser 35 (i.e., dispersive delay line) from an ancillary pulse 34. Two spatially sheared replicas 36a and 36b of this chirped pulse 36 are then created using a spatial shearing interferometer 38. These pulses 36a and 36b propagate in the same direction but with a lateral separation (spatial shear) X, and a relative delay $\tau$. The input test pulse 33 propagates parallel to the chirped pulses 36a and 36b but laterally separated from both of them. In non-linear conversion 39, all three beams (i.e., pulses 33, 36a and 36b) are focused in to a nonlinear crystal 44 arranged, such as for upconversion, by means of a lens 41 of focal length f (FIG. 6). The angle at which adjacent wavefronts intersect at the crystal is therefore close to $X/f$ radians. This gives rise to two upconverted replicas 44 of the test pulse 33 at different frequencies $\omega + \omega_0$ and $\omega + \omega_0 + \Omega$, which are collimated by lens 42 along the same direction and then focused by lens 45 onto 2-dimensional imaging spectrometer 46.

The frequency shear $\Omega$ in the shifted replicas of the test pulse is proportional to the delay between the two chirped pulses. If this delay is zero, then there is no frequency shear. The measured interferogram is given by:

$$S(x,\omega) = |\tilde{E}(x, \omega+\omega_0) + \tilde{E}(x, \omega+\omega_0+\Omega)e^{ikXx/f}|^2$$

where $\omega$ is the spectrometer pass frequency, $\omega_0$ the center frequency and k the mean wavenumber of the frequency shifted pulse. (A unit magnification imaging system after the nonlinear crystal relays the beams at the crystal onto the entrance slit of the spectrometer.)

The spatial fringes present in this interferogram can be used as a carrier to separate out the interference term by Fourier processing. This is done using the same algorithms as in conventional SPIDER, except that the Fourier transform is taken with respect to the spatial axis, so that the interferometric component is extracted in the k domain. The phase of one of the components of the interference term is With the exception of the phase term linear in x, this is the same as the spectral phase returned in conventional SPIDER. In fact, one could average this phase over the spatial coordinate before doing the integration along the frequency axis, and obtain an accurate reconstruction of the spectral phase of the test pulse to within a constant. However, it is usually better to remove the linear term before integrating because of possible systematic errors in the relay optics that can lead to space-time coupling (e.g., aberrations in the imaging lenses or in the spectrometer optics). This can be done by setting the delay between the two chirped pulses to zero. This guarantees that the shear $\Omega$ is also zero, and therefore that the measured interferogram contains no information about the pulse spectral phase. In this case the phase returned from the processing algorithm is simply $kXx/f$. This calibration can be subtracted from the previously measured phase before integrating and reconstructing the spectral phase of the pulse.

Figure 7:
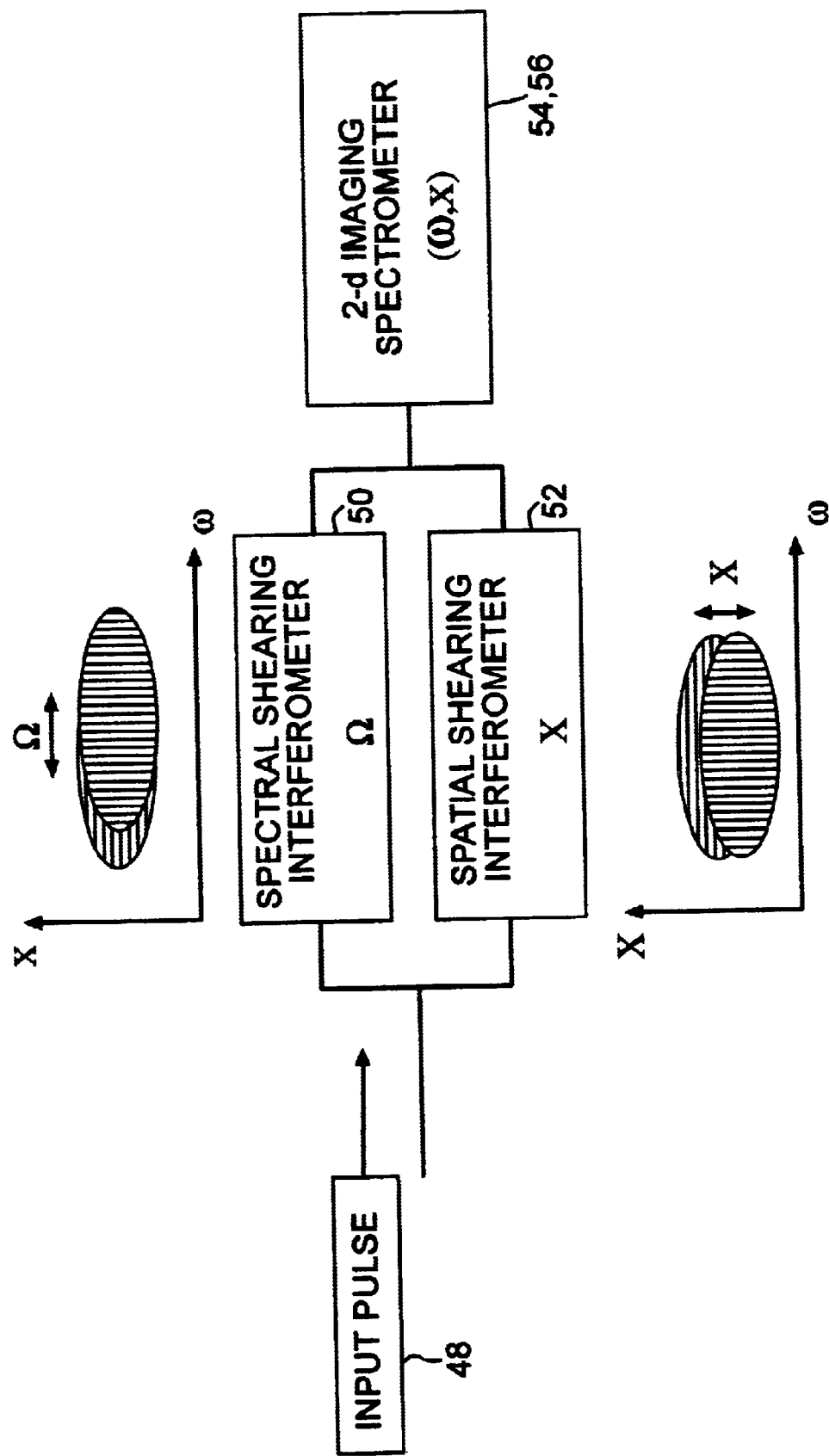
FIG. 7 is a schematic diagram illustrating the design of a Space-time SPIDER (ST-SPIDER).

Referring to FIGS. 7–11, there is shown a space-time or ST-SPIDER system and components thereof. All the existing techniques for the characterization of ultrashort optical pulses, including SPIDER and the innovations presented here, assume that the temporal pulse shape is identical at all locations in the beam. (In practice the energy of an ultrashort optical pulse is typically located in space in a beam with a diameter of less than 5 mm). In many situations, this assumption is actually not valid because of the extensive use of optical elements that produce space-time coupling, such as lenses, gratings and prisms, in the generation and applications of ultrashort optical pulses. The ST-SPIDER has the ability to measure the electric field as a function of time and space. Space-time SPIDER operates by implementing shearing interferometry simultaneously in the spatial and spectral domain (FIG. 7). Conventional SPIDER allows the characterization of the pulse at a given point in space using only the one-dimensional interferogram generated by the two SPIDER replicas. ST-SPIDER provides a spectral gradient of the phase of the input phase. The phase in space and frequency is derivable from the spatial gradient of the phase. This is achieved in ST-SPIDER by using a two-dimensional interferogram. SPIDER is thus extended to the spatial domain, in a way which is superior compared to more complicated techniques like FROG which already make use of a two-dimensional experimental trace to characterize a pulse at a single point in space.

Figure 8:
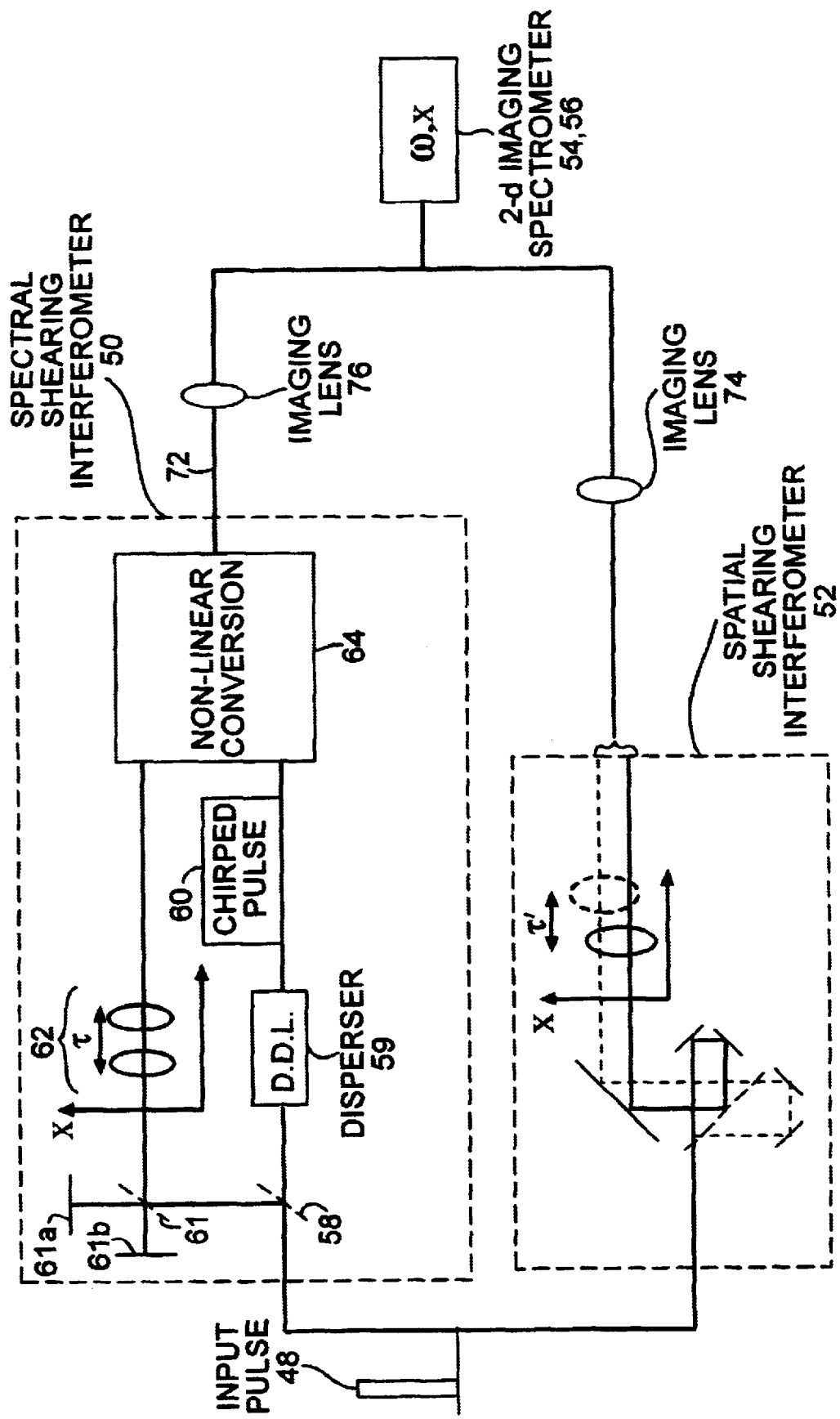
FIG. 8 is a schematic diagram of an embodiment of a ST-SPIDER.

The implementation of space-time SPIDER relies on two different interferometers 50 and 52 (FIGS. 7 and 8). SPIDER is implemented using a non-linear interaction geometry (FIG. 9), a two-dimensional spectrometer 54 (available, for example, from Instruments SA, Model Triax 320) and a two-dimensional detector array 56 (such as the MaxCam camera from Finger Lakes Instruments). Applying the SPIDER inversion at each spatial location within the beam, one may characterize the pulse at each point. In this reconstruction, however, there is no information about the relative time delay of the pulses at each point in the beam. In most cases, this quantity is the largest source of error in the reconstructed pulse shape.

In FIG. 8, an input test pulse 48 is operated upon by a spectral shearing interferometer 50, where a portion of the input test pulse 48 is transmitted by a beam splitter 58 to a disperser 59 to provide a chirped pulse 60, and the deflected portion of the input test pulse 48 is processed to provide two delayed replicates 62 of the input test pulse 48. The two delayed replicates 62 may be produced using a beam splitter 61 to split the test pulse into two replicas, which are deflected by two mirrors 61a and 61b such that the replicas when combined back by beam splitter 61 are delayed with respect to each other. In non-linear conversion 64 shown in FIG. 9, the delayed replicas 62, focused by a lens 65, are combined, via a mirror 66, by a beam splitter 68 with the chirped pulse 60. The combined delayed replicas 62 and chirped pulse 60 interact in a non-linear crystal 70 to obtain spectrally sheared replicas 72, which are then collimated by a lens 71. The output of the spatial shearing interferometer 52 is imaged by a lens 74 and then combined with the spectrally sheared replicas 72, via imaging lens 76, from the spectral shearing interferometer 50 onto two-dimensional spectrometer 54 for detection by detector array 56.

Here there is coupling of the information given by the two different interferometers. The new interferometer is based on a spatial shearing interferometer 52 (i.e., a device that takes a beam at its an input and generates at its output two spatially sheared replicas of this beam) followed by a two-dimensional spectrometer 54. This spectrometer 54 makes use of linear passive devices to measure the difference of the pulse shape from one point to another without providing the information on the actual temporal shape at any of these points. It is sensitive to the delay between the pulses at different locations, and thus provides the missing information in the spatially resolved SPIDER trace.

Measurement of the spectral gradient of the phase as a function of the position in the beam extends SPIDER technology. In conventional SPIDER, assuming that there is no spatial dependence of the temporal pulse shape of the input electric field pulse, the non-linear interaction of two replicas of this field with the instantaneous frequencies $\omega_0$ and $\omega_0 + \Omega$ of a highly chirped pulse results in a spectral shear $\Omega$ between the two converted pulses. From the resulting one-dimensional interferogram, is extracted the gradient of the phase $\Phi$ of the input pulse, which can be integrated to retrieve $\Phi$. This principle can be extended by spatially resolving the spectral phase gradient provided the spatial information is preserved during the non-linear interaction and the acquisition of the interferogram. This can be achieved by focusing the two replicas 62 in a thin nonlinear crystal 70 where they interact with the unfocused chirped pulse 60 (see FIG. 9). Because of the relative size of the focused beams compared to the unfocused chirped pulse, one may consider the interaction as being equivalent to that with plane waves of instantaneous frequency $\omega_0$ and $\omega_0 + \Omega$. A lens 71 after the nonlinear medium recollimates the two replicas. Because of the Fourier transform relation between the fields in the front and rear focal planes of a lens, two spectrally sheared replicas of the input field are obtained at the output with the same spatial amplitude and phase as the input replicas. The resulting interferogram is measured as a function of x and $\omega$ with a two-dimensional imaging spectrometer 54. By applying the conventional Fourier Transform Spectral Interferometry filtering operation to each line of the interferogram along the spatial axis, one obtains the phase derivative This information allows one to reconstruct the pulse shape at each location in the beam, but contains no wavefront information (for example, it can not measure the focusing of the beam, or the pulse front tilt). Because the SPIDER direct inversion algorithm only takes a few milliseconds to retrieve the pulse shape, the processing of the two-dimensional interferogram can be done in well under a second, usually limited by the readout time of the detector array 56. The measurement of the gradient is performed by imaging on the slit of the two-dimensional spectrometer the input beam at the fundamental frequency through the two arms of a spatial lateral shearing interferometer, for example a Michelson interferometer. Such an interferometer provides independent control of the shear, tilt and delay between the two imaged pulses. Measurement of the spectrally resolved spatial interferogram for a given tilt K, shear X and delay $\tau$ gives $|E(x+X,\omega)+E(x,\omega)\exp(iKx)\exp(i\omega\tau)|^2$, from which $\Phi(x+X,\omega)-\Phi(x,\omega)+Kx+\omega\tau$ can be extracted by Fourier-domain filtering, provided the modulation due to the spatio-spectral carrier frequency $Kx+\omega\tau$ is sufficient Note that this carrier frequency is necessary to extract the interferometric component, but it is mandatory to remove it after extraction, before doing any integration. A calibration trace to remove this quantity from the extracted phase can be obtained by setting the shear to zero and measuring the resulting interferogram. It must also be noted that only the presence of either tilt or delay between the two pulses is needed. For example, in the example given in FIG. 11, the two pulses propagate exactly in the same direction (thus the tilt K is equal to zero), but are separated by a delay r depending upon the birefringence of the optical element.

This interferogram gives the spatial phase derivative

Figure 10:
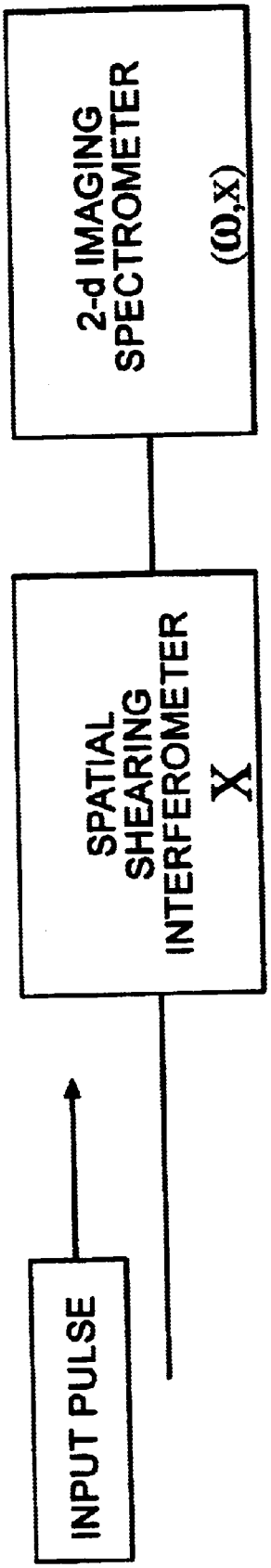
FIG. 10 is a generalized schematic showing measurement of the spatial variation of the spectral phase.

The spatial gradient can be integrated for each frequency to give $\Phi(x,\omega)+\alpha(\omega)$, where $\alpha(\omega)$ is an arbitrary function that is independent of the spatial location in the beam. Any dependence of this phase upon x is a sign of space-time coupling, since this phenomenon manifests itself when the spectral phases at two distinct locations in the beam differ. Of course, one only measures the spatial differences of the spectral phase, and not the spectral phase itself. In practice, space-time coupling can be studied using only linear (hence very sensitive) devices, by measuring the spectrum as a function of the position and any phase written as $\Phi(x,\omega)+\alpha(\omega)$. The first task can be achieved by just sending the beam on the slit of a two-dimensional imaging spectrometer. The second task can be achieved using any spatial shearing interferometer followed by a two-dimensional imaging spectrometer (FIG. 10). This particular feature is potentially very valuable as a diagnostic for laser pulses in applications where the pulse energy must be delivered on target in a way that each point of the pulse arrives at the same time, such as in femtosecond laser machining. It also provides a device for characterizing the spatial properties of a broadband beam of light, analogous to the $M^2$ parameter that is commonly specified for quasi-monochromatic beams.

From the two gradients various procedures can be used to reconstruct the phase corresponding to the least-square solution, based on the extensive work done in two-dimensional spatial shearing interferometry. Using a different carrier modulation for each interferogram (in practice, delay between the two output replicas of the SPIDER spectral shearing interferometer, and tilt between the two replicas for the spatial shearing interferometer) allows their simultaneous measurement and the extraction of the relevant interferometric components by Fourier transforming and filtering, thus enabling the single-shot operation.

The spatial shearing interferometer 52 can be a Michelson interferometer, as represented in FIG. 8. A particularly elegant solution is presented in FIG. 11, based on a polarization interferometer. A birefringent element 78 (i.e., an element such as the optical index is not identical for all polarizations of light) can be used. If its optical axis lies in the (x,z) plane, a beam polarized along the y axis incident on this element will not change its direction while propagating in the crystal. However, a beam polarized along the x axis will propagate at a different angle in the crystal. If one then sends a beam polarized at 45 degrees on this element, the beam separates into the two polarizations x and y, which propagate independently in the element. After leaving the crystal, one then gets two sheared replicas of the input beam.

These pulses are also delayed with respect to each other because of the difference in the index of refraction for the 2 polarizations. Because the two beams have orthogonal polarizations, they cannot interfere. It is then necessary to use a polarizer 80. After being polarized along the same direction, the two pulses can be sent to a two-dimensional imaging spectrometer in order to record the interferogram. The presence of the delay between the two pulses ensures that the interferometric component can be extracted directly, thus giving the spatial gradient of the phase of the input pulse as a function of the frequency.

Figure 1A:
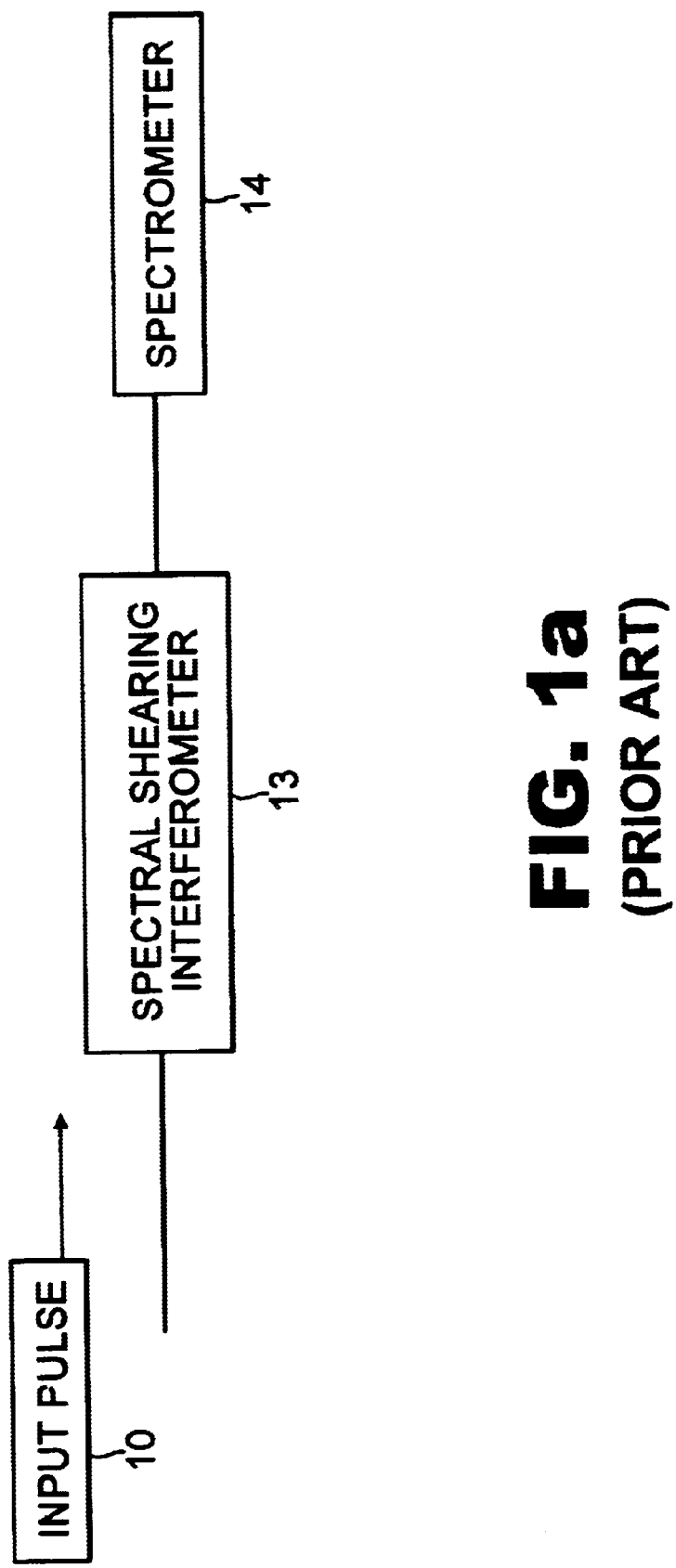

As will be apparent from FIGS. 1a and 1b, and by reference to PCT International Application No. PCT/US98/15355, now International Publication No. WO99/06794, published Feb. 11, 1999 (which by their reference is incorporated herein) a conventional SPIDER system makes use of shearing interferometry in the spectral domain to measure the temporal shape of a pulse of light. In conventional SPIDER, the two replicas of the input pulse T1 and T2, separated by τ, are mixed with a chirped pulse in a non-linear crystal. This gives two pulses, S1 and S2, frequency-shifted by $\omega_0$ and $\omega_0+\Omega$ respectively, and separated in time by a delay τ. The spectrum of the sum of the two fields is measured using a monodimensional spectrometer. The spectral phase of the input pulse is directly extracted from the interferogram.

As will be apparent from FIGS. 2a and 2b, only one replica of the pulse interacts with the chirped pulse. This shifts the complex spectral amplitude of the pulse to a new frequency. The phase difference between the converted replica and a homodyne pulse H is measured. Two steps are needed, in which two different interferograms are measured for two different delays between the chirped pulse and the replica. The spectral phase of the input pulse is extracted from difference of the two measured spectral phase differences.

As shown in FIGS. 4a and 4b, an ancillary pulse (or part of the input pulse itself) is sent to a dispersive delay line followed by a spatial shearing interferometer. This generates two chirped pulses, sheared in space, separated by a user-controlled delay. When these pulses are focused with the test pulse T one wants to characterize, they propagate at different angles. The interaction of T with each chirped pulse generates a spectrally shifted replica of T, propagating at a different angle. After the collimating lens, the two replicas S1 and S2 are spatially sheared. When focused on the slit of a two-dimensional imaging spectrometer, they give rise to spatial fringes. These spatial fringes allow the extraction of the spectral phase difference between S1 and S2, and thus the reconstruction of the spectral phase of the input pulse. The extraction is accomplished by means of the same algorithms used in conventional SPIDER.

As shown in FIG. 5, the two chirped pulses are generated from an ancillary input pulse (or from the test pulse itself) via a dispersive delay line and a modified Michelson lateral shearing interferometer. The pulses are separated in time by delay t and in space by shear X. The test pulse is then mixed with these two pulses in a non-linear crystal, and this generates two spectrally sheared replicas of the test pulse traveling in different directions toward the spectrometer. The focusing lens causes the replicas to overlap spatially at the entrance to the imaging spectrometer. The resulting interferogram is spectrally and spatially resolved, and has fringes predominantly parallel to the frequency (spectral) axis.

In FIG. 6, after focusing lens L1, the two chirped pulses travel in different directions. The interaction with the test pulse leads to two spectrally replicas of this pulse. These replicas are spectrally sheared because of the delay between the two chirped pulses. They propagate in different directions because of the different directions of the input chirped pulses. After recollimation in lens L2, the two replicas S1 and S2 travel in the same direction. A third lens focuses the pulses on the slit of the imaging spectrometer. Spatial fringes arise in the spatially and spectrally resolved interferogram because of the different directions of propagation of the two focused beams.

Referring to FIG. 7, ST-SPIDER enables the measurement of the phase gradient in two orthogonal directions, one spatial and one spectral. Two spectrally sheared replicas of the input test pulse are generated. They may be obtained, for example, from upconversion of two replicas of the input pulse with a chirped pulse. They are coincident on an imaging spectrometer and the resulting interferogram is spectrally and spatially resolved. This interferogram provides the gradient of the phase in the spectral direction. Two other replicas of the pulse, this time sheared (laterally separated) in space, also interfere and the gradient of the phase in the spatial direction can be obtained from the resulting spatially and spectrally resolved interferogram. In this case, in contrast to SEA-SPIDER, there is different information at all points in the simultaneously measured pair of interferograms.

As shown in FIG. 8, a spectral shearing interferometer and a spatial shearing interferometer operate on the input pulse, generating two pulse pairs. One pair is sheared in frequency, the other in a lateral spatial direction. A two-dimensional spectrometer resolves as a function of x and $\omega$ the two resulting interferograms. These interferograms are superimposed on the detector, and can be separated by Fourier processing, since their fringes have orthogonal contours.

Figure 9:
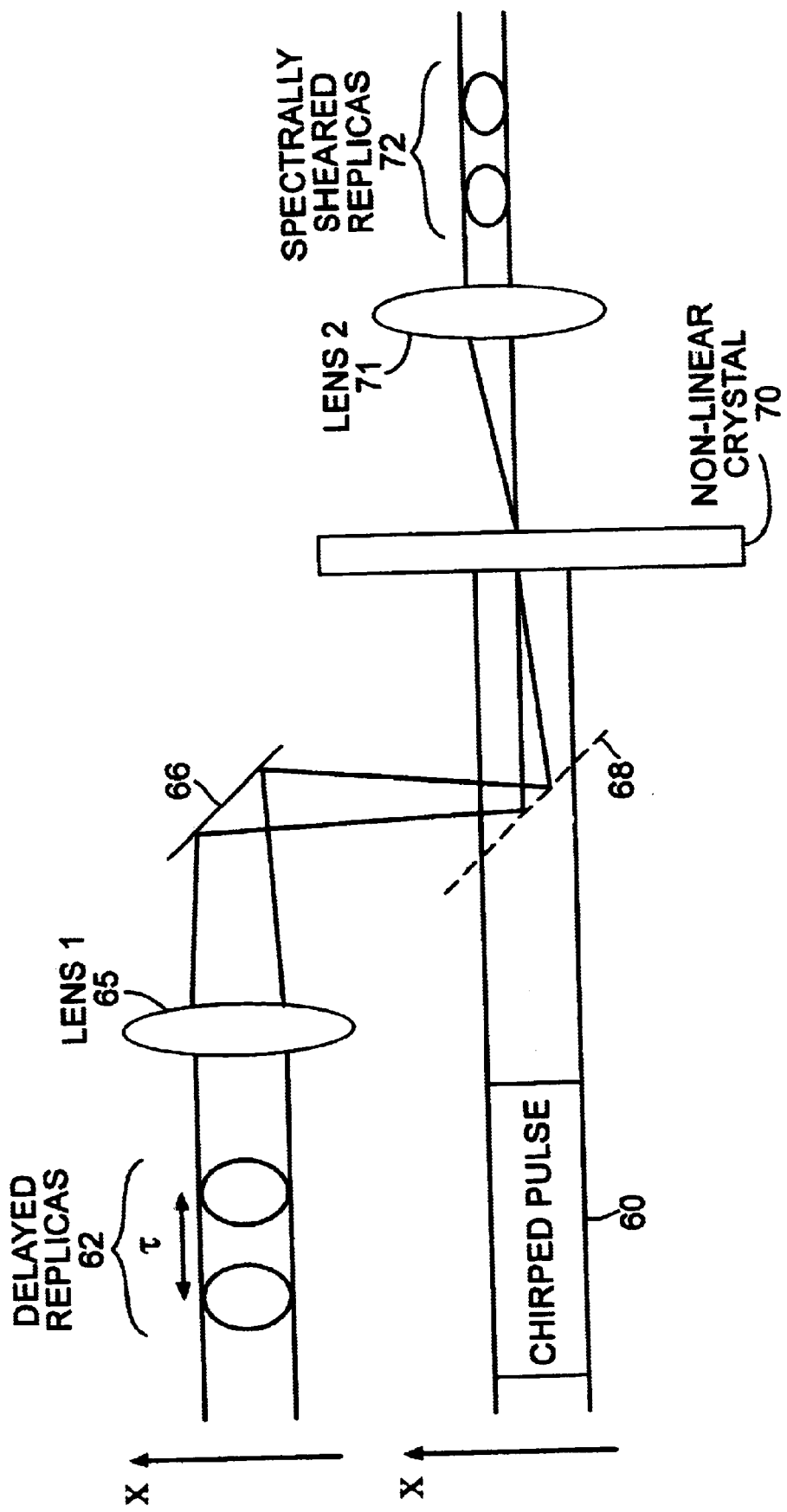
FIG. 9 is a more detailed schematic of the non-linear conversion subcomponent in the ST-SPIDER shearing interferometer shown in FIG. 8.

In FIG. 9, the two replicas of the test pulse are focused in the non-linear crystal, while the chirped pulse is unfocused. This ensures that the upconversion of each replica will be performed with a wave containing a single frequency (either $\omega_0$ or $\omega_0+\Omega$) and having a constant spatial phase and amplitude. Thus, the spatial profile is preserved during the interaction. (In conventional SPIDER the chirped pulse is also focused, so that the signal averages over all spatial variations.). The second lens then recollimates the two frequency-shifted pulses. This results in two spatially laterally coincident replicas of the input pulse that are yet sheared in the frequency domain.

In FIG. 10, a lateral spatial shearing interferometer followed by a two-dimensional shearing interferometer allows the measurement of the spatial-spectral phase function $\phi(x, \omega)+\alpha(\omega)$ of the input pulse. Any dependence of this function upon x is a sign of space-time coupling.

Figure 11:
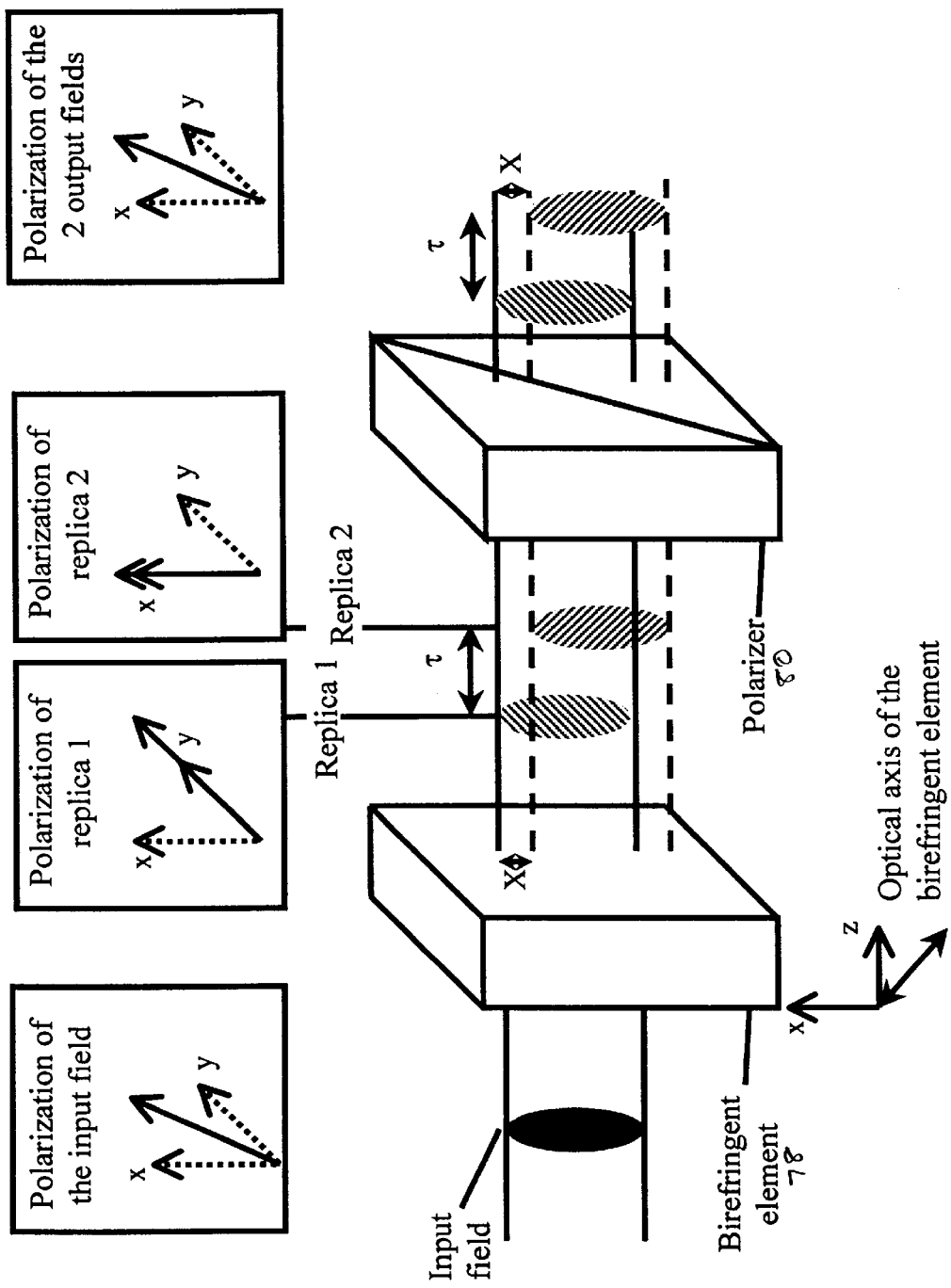
FIG. 11 is a schematic of a spatial shearing interferometer of compact design, usable in the ST-SPIDER of FIG. 8.

As shown in FIG. 11, the birefringent element, called in this context a Savart plate, generates a pair of pulses that are temporally delayed with respect to one another, as well as spatially sheared. This allows the relative spatial-spectral phase to be extracted from the interferogram by Fourier processing.

Variations and modifications of the herein described systems within the scope of the invention will undoubtedly become apparent to those skilled in the art. The foregoing description should therefore be taken as illustrative and not limiting.

What is claimed is:

1. A method for measuring a pulse which comprises the steps of shearing said pulse and providing, by both linear and non-linear interferometry, a plurality of spectral and temporal phase differences which are temporally, or both spatially and temporally, displaced, and characterizing the pulse from said phase differences in a spectrometer.

2. The method according to claim 1 wherein said phase differences are obtained using homodyne detection.

3. The method according to claim 1 further comprising the step of generating spectrally sheared replicas of said pulse which are spatially displaced to spatially encode said phase differences.

4. The method according to claim 1 further comprising the step of measuring spatial and spectral phase gradients of said differences in different directions.

5. The method according to claim 4 wherein said different directions are orthogonal to each other.

6. The method according to claim 1 wherein said pulse is sub-picosecond in duration.

7. The method according to claim 1 wherein said pulse is produced by a laser.

8. A system of interferometry comprising:
   means for transmitting a pulse in a beam along two paths which are tilted with respect to each other and which form two collinear beams at an output end of said paths;
   means for interfering the collinear beams at said output end; and
   means responsive to the interfering beams in at least two directions for obtaining spectral or temporal characteristics of said pulse.

9. A method of interferometry comprising the steps of:
   transmitting a pulse in a beam along two paths which are tilted with respect to each other and which form two collinear beams at an output end of said paths;
   interfering the collinear beams at said output end linearly or non-linearly; and
   obtaining spectral or temporal characteristics of said pulse in accordance with said interfering beams in at least two directions.

10. A method of interferometry comprising the steps of providing spectrally sheared beams corresponding to an input pulse, providing temporally or spatially sheared replicas of said input pulse, and imaging all said replicas on a two-dimensional spectrometer thereby obtaining information on the phase characteristics of said input pulse.

11. The method of claim 10 wherein said input pulse is passed through a birefringent element and a polarizer to obtain said spatially sheared replicas.

12. The method of claim 3 wherein said spectrometer is operative in two dimensions.

13. The method of claim 1 wherein said characteristics are spectral and temporal characteristics which are respectively obtained with different spectrometers.

14. The system of claim 8 wherein said means for obtaining said spectral characteristics or the temporal characteristics includes separate interferometers for said spectral and the other for said temporal characteristics.

15. A method for measuring a pulse which comprises spectrally shearing said pulse to provide a plurality of spectral differences, temporally shearing said pulse to provide a plurality of temporal differences, and spatially and temporally characterizing said pulse from said differences.

16. The method of claim 1 wherein said temporal differences are obtained with the aid of a spectral shearing interferometer and said spatial differences are obtained with the aid of a spatial shearing interferometer.

* * * * *

UNITED STATES PATENT AND TRADEMARK OFFICE
CERTIFICATE OF CORRECTION

PATENT NO. : 6,633,386 B2
DATED : October 14, 2003
INVENTOR(S) : Walmsley et al.

It is certified that error appears in the above-identified patent and that said Letters Patent is hereby corrected as shown below:

<u>Column 1,</u>
Line 5, insert the following paragraph:
-- The U.S. Government may have rights in this patent pursuant to the following contract between the National Science Foundation and The University of Rochester under Grant No. PHY-9724019. --

Signed and Sealed this

Fifteenth Day of June, 2004

JON W. DUDAS
*Acting Director of the United States Patent and Trademark Office*